United States Patent
Ewald et al.

(10) Patent No.: US 11,559,939 B2
(45) Date of Patent: Jan. 24, 2023

(54) DISPENSING POWDERED BUILD MATERIAL FOR ADDITIVE MANUFACTURING

(71) Applicant: HEWLETT-PACKARD DEVELOPMENT COMPANY, L.P., Houston, TX (US)

(72) Inventors: Brent Ewald, Vancouver, WA (US); Kenneth R. Williams, Vancouver, WA (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 708 days.

(21) Appl. No.: 16/067,652

(22) PCT Filed: Apr. 10, 2016

(86) PCT No.: PCT/US2016/026849
§ 371 (c)(1),
(2) Date: Jul. 2, 2018

(87) PCT Pub. No.: WO2017/180084
PCT Pub. Date: Oct. 19, 2017

(65) Prior Publication Data
US 2020/0262136 A1    Aug. 20, 2020

(51) Int. Cl.
*B29C 64/153* (2017.01)
*B29C 64/214* (2017.01)
(Continued)

(52) U.S. Cl.
CPC .......... *B29C 64/153* (2017.08); *B29C 64/214* (2017.08); *B29C 64/236* (2017.08);
(Continued)

(58) Field of Classification Search
CPC ... B29C 64/153; B29C 64/214; B29C 64/255; B29C 64/236; B29C 64/205; B29C 64/35; B33Y 10/00; B33Y 30/00
See application file for complete search history.

(56) References Cited

U.S. PATENT DOCUMENTS 5,387,380 A    2/1995    Cima et al.
8,185,229 B2   5/2012    Davidson
(Continued)

FOREIGN PATENT DOCUMENTS

EP    1270185 A1    1/2003
EP    1600282 A1    11/2005
(Continued)

OTHER PUBLICATIONS

Ian Gibson; "Additive Manufacturing Technologies"; 2015; https://books.google.co.in/books?hl=en&lr=&id=OPGbBQAAQBAJ&oi=fnd&pg=PR5&dq=(powder+deposit)+print+3D+remove+excess%7Cextra+powder#v=onepage&q&f=false.

*Primary Examiner* — Matthew J Daniels
*Assistant Examiner* — Shibin Liang
(74) *Attorney, Agent, or Firm* — Shook, Hardy & Bacon L.L.P.

(57) ABSTRACT

In one example, a powdered build material supply system for additive manufacturing includes a supply deck, a dispenser to dispense a ribbon of powdered build material on to the supply deck, and a spreader to spread powdered build material from the ribbon over a work area adjacent to the supply deck.

19 Claims, 14 Drawing Sheets

(51) Int. Cl.
*B29C 64/255* (2017.01)
*B29C 64/236* (2017.01)
*B33Y 40/00* (2020.01)
*B33Y 40/10* (2020.01)
*B33Y 10/00* (2015.01)
*B33Y 30/00* (2015.01)

(52) U.S. Cl.
CPC ............ *B29C 64/255* (2017.08); *B33Y 40/00* (2014.12); *B33Y 40/10* (2020.01); *B33Y 10/00* (2014.12); *B33Y 30/00* (2014.12)

(56) References Cited

U.S. PATENT DOCUMENTS

| | | | |
|---|---|---|---|
| 8,888,480 | B2 | 11/2014 | Yoo et al. |
| 8,968,625 | B2 | 3/2015 | Tan |
| 2005/0263933 | A1 | 12/2005 | Welch et al. |
| 2006/0141145 | A1 | 6/2006 | Davidson et al. |
| 2006/0175346 | A1 | 8/2006 | Ederer et al. |
| 2009/0068376 | A1* | 3/2009 | Philippi ................ B29C 64/153 427/532 |
| 2009/0169664 | A1 | 7/2009 | Cox |
| 2013/0108726 | A1* | 5/2013 | Uckelmann ........... B29C 64/176 425/375 |
| 2014/0252685 | A1 | 9/2014 | Stucker et al. |
| 2015/0321255 | A1* | 11/2015 | Colin ..................... B28B 1/001 419/55 |
| 2019/0001560 | A1* | 1/2019 | Walrand ................ B33Y 30/00 |

FOREIGN PATENT DOCUMENTS

| | | | |
|---|---|---|---|
| JP | H08502703 | 3/1996 | |
| JP | 2006205456 | * 1/2005 | ............ B29C 67/00 |
| JP | 2005335392 | 12/2005 | |
| JP | 2006-205456 | 8/2006 | |
| JP | 2009279928 | 12/2009 | |
| WO | WO-2003097518 | 11/2003 | |
| WO | WO-2017108868 | 6/2017 | |

* cited by examiner

DISPENSING POWDERED BUILD MATERIAL FOR ADDITIVE MANUFACTURING

BACKGROUND

Additive manufacturing machines produce 3D (three-dimensional) objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices each defining that part of a layer or layers of build material to be formed into the object.

DRAWINGS

The same part numbers designate the same or similar parts throughout the figures. The figures are not necessarily to scale.

DESCRIPTION

In some additive manufacturing processes, heat is used to fuse together the particles in a powdered build material to form a solid object. Heat to fuse the build material may be generated, for example, by applying a liquid fusing agent to a thin layer of powdered build material in a pattern based on the object slice and then exposing the patterned area to light or other fusing energy. Energy absorbing components in the fusing agent absorb energy to help sinter, melt or otherwise fuse the build material. The process is repeated layer by layer, slice by slice to complete the object. It is sometimes desirable to pre-heat powdered build material before the powder is layered on to the work area for patterning and fusing. Transporting and dispensing hot powder can be difficult, however, particularly for powder that is pre-heated to near its softening temperature.

A new dispensing technique has been developed for additive manufacturing to help avoid the difficulty of handling hot powder before patterning and fusing. In one example, a "ribbon" of powdered build material is dispensed on to a supply deck immediately adjacent to the work area. "Ribbon" in this context refers to a layer of powder in which the ratio of width to height (thickness) is at least 15:1. The relatively large surface area of the ribbon enables quickly pre-heating the powder on the supply deck to help avoid the difficulty of transporting and dispensing hot powder. As detailed below, while the aspect ratio of the powder supply ribbon may vary depending on the characteristics of the build material and other manufacturing parameters, testing indicates that an aspect ratio of at least 15:1 will be sufficient for polyamide and other powders commonly used for many additive manufacturing applications.

A build material supply ribbon may dispensed on to the deck, for example, using a choked flow type dispenser in which the powder is layered on to the supply deck in a thickness corresponding to a gap between the dispenser and the deck, where the gap is small enough to choke the flow of powder from the dispenser when the dispenser is stationary over the deck. With a choked flow dispenser, the powder ribbon can be layered on to the supply deck with the dispenser alone, if desired, without dispensing excess powder and to a uniform width and thickness. In one example, a multi-bladed dispenser is used to dispense the supply ribbon. In this example, the dispenser includes a raised, metering blade along one side of the dispenser and a wiper blade flush to the deck along the other side of the dispenser. The metering blade layers powder on to the supply deck in the desired thickness when the dispenser is moving in one direction and wiper blade wipes any powder on the deck when the dispenser is moving in the opposite direction.

These and other examples described below and shown in the figures illustrate but do not limit the scope of the patent, which is defined in the Claims following this Description.

As used in this document: "and/or" means one or more of the connected things; a "fusing agent" means a substance that causes or helps cause a powdered build material to sinter, melt or otherwise fuse; a "detailing agent" means a substance that inhibits or prevents or enhances fusing a build material, for example by modifying the effect of a fusing agent; "energy" means electromagnetic radiation of any wavelength; a "ribbon" means a layer of powder in which the ratio of width to height (thickness) is at least 15:1; and "work area" means any suitable structure to support or contain build material for fusing, including underlying layers of build material and in-process slice and other object structures.

Figure 1:
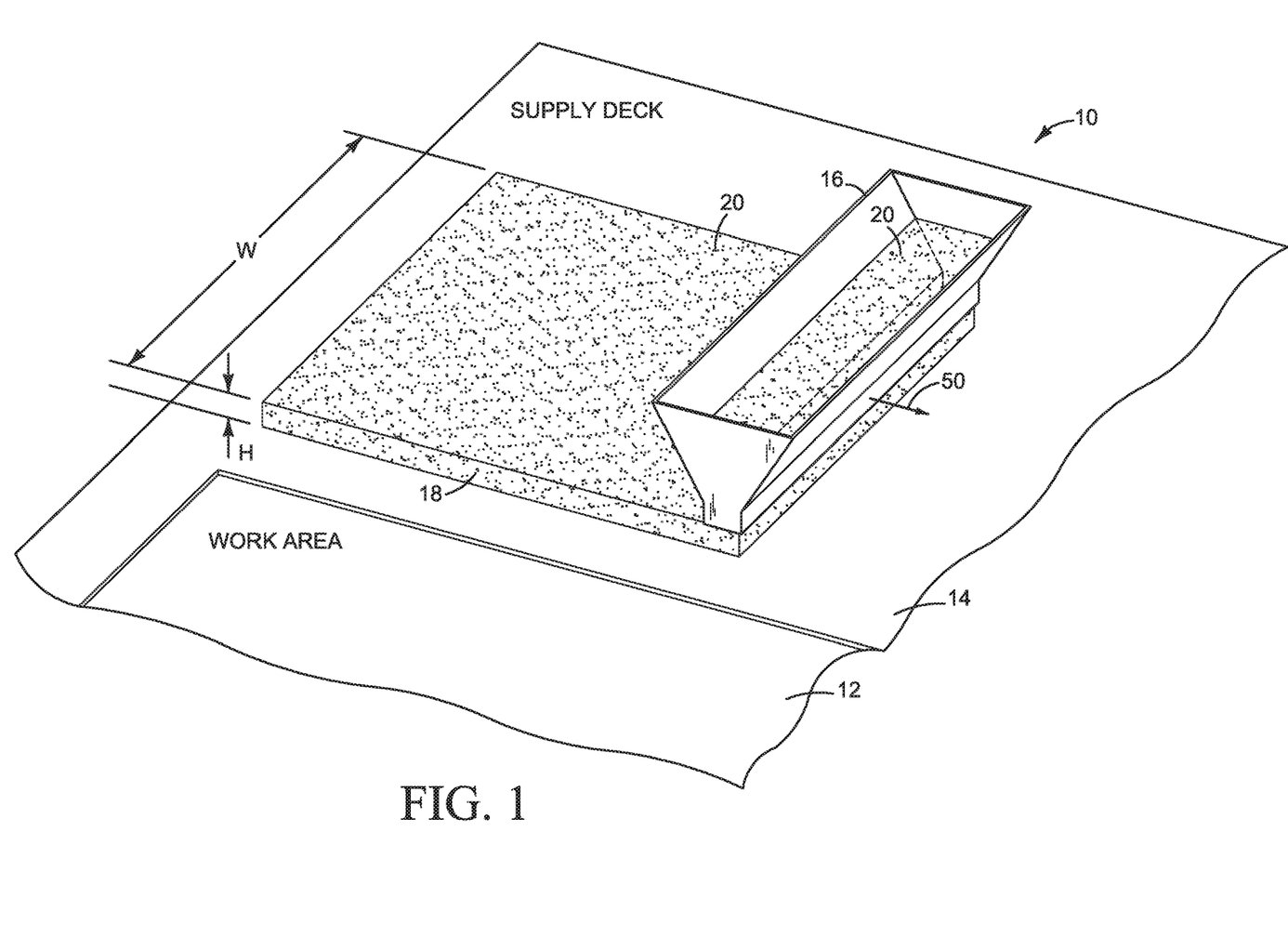
FIG. 1 is a perspective illustrating one example of a build material supply system for additive manufacturing.

FIG. 1 is a perspective illustrating one example of a build material supply system 10 for additive manufacturing. Referring to FIG. 1, system 10 includes a work area 12, a supply deck 14 adjacent to work area 12, and a dispenser 16 to dispense a ribbon 18 of powdered build material 20 on to supply deck 14. The comparatively large surface area of a powder ribbon 18, compared to a pile of powder for example, enables quicker pre-heating build material 20 on supply deck 14 before spreading the build material over work area 12. Build material 20 in ribbon 18 may be heated on supply deck 14, if desired, for example by conduction from below and/or by irradiation from above.

Figure 2:
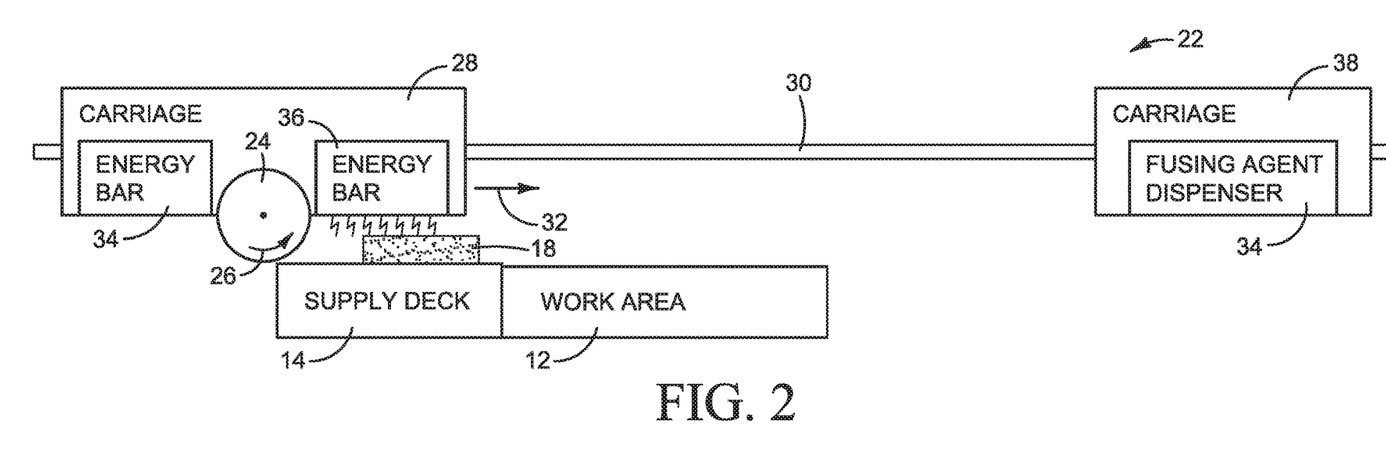
FIGS. 2 and 3 are block diagrams illustrating one example for pre-heating build material dispensed in a ribbon along a supply deck adjacent to a work area and then spreading the pre-heated build material over the work area.
Figure 3:
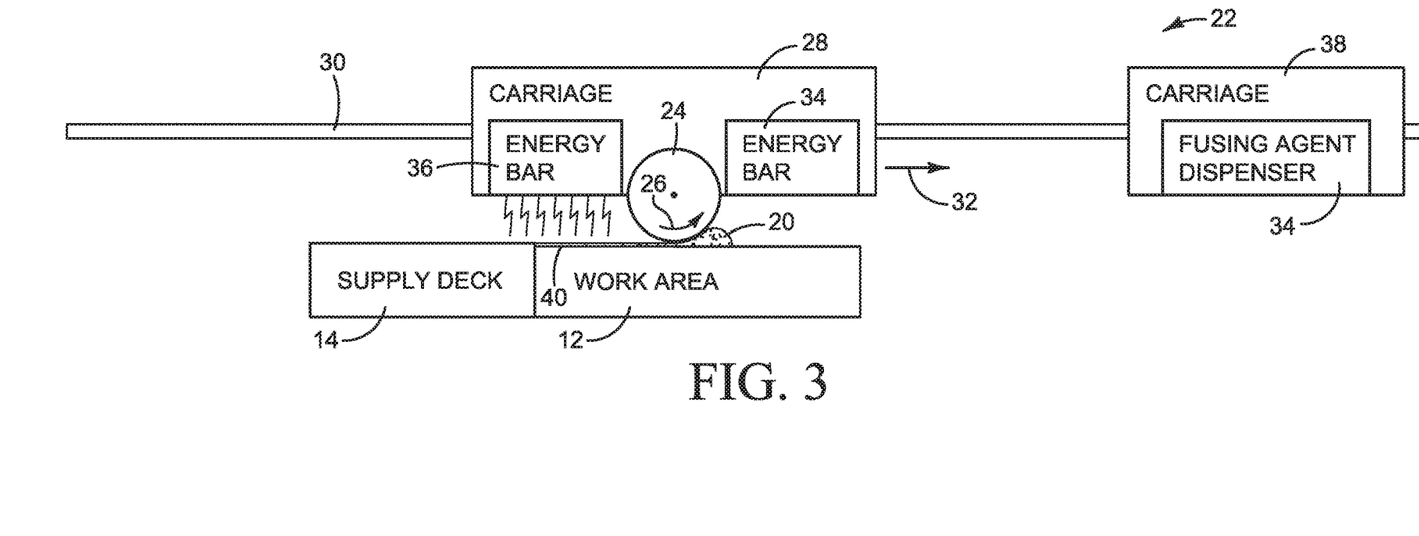

FIGS. 2 and 3 are block diagrams illustrating one example for pre-heating build material 20 in ribbon 18 on supply deck 14, and then spreading build material 20 over work area 12. Referring to FIGS. 2 and 3, an additive manufacturing machine 22 includes a work area 12, a supply deck 14 adjacent to work area 12, and a spreader 24 to spread build material from ribbon 18 over work area 12. Additive manufacturing machine 22 also includes a build material dispenser 16, such as dispenser 16 shown in FIG. 1. A dispenser 16 is not shown in FIGS. 2 and 3 to more clearly illustrate the other components of machine 22. In this example, spreader 24 is implemented as a roller. Spreader roller 24 may rotate freely as it is moved over work area 20, freewheeling clockwise or counter-clockwise depending on the direction of travel, or roller 24 may be driven rotationally in either direction (co-rotated or counter-rotated). Rotation arrow 26 in FIGS. 2 and 3 indicates a counter-rotating spreader roller 24.

As noted above, work area 12 in the figures represents any suitable structure to support or contain build material for fusing, including underlying layers of build material and in-process slice and other object structures. For a first layer of build material, for example, work area 12 may be formed on the surface of a platform that moves up and down to adjust the thickness of each layer. For succeeding layers of build material, for example, work area 12 may be formed on the underlying layer (or layers) of build material, which may include fused and unfused build material.

Still referring to FIGS. 2 and 3, spreader roller 24 is mounted to a movable carriage 28 that carries roller 24 back and forth over work area 12, for example along a rail 30. Roller 24 is shown moving to the right in FIGS. 2 and 3, as indicated by translation arrow 32. In this example, additive manufacturing machine 22 also includes a fusing agent dispenser 34 and a source 36 of light or other fusing energy. Fusing agent dispenser 34 is mounted to a movable carriage 38 and energy source 36 is implemented as energy bars 36 mounted to roller carriage 28. Dispenser carriage 38 carries fusing agent dispenser 34 back and forth over work area 12, for example along rail 30.

In one example operation, the leading energy bar 36 is energized to irradiate and thus heat powder ribbon 18 as roller carriage 28 moves to the right over supply deck 14, as shown in FIG. 2. As roller carriage 28 continues to the right, roller 24 spreads build material 20 from ribbon 18 on supply deck 14 in a layer 40 over work area 12, as shown in FIG. 3. If desired, the trailing energy bar 36 may be energized to irradiate powder layer 40 during a spreading operation, also as shown in FIG. 3. Thereafter, as described below with reference to FIGS. 12-18, a fusing agent is selectively applied to layered build material in a pattern corresponding to an object slice, as fusing agent dispenser 34 on carriage 38 is moved over work area 12. One or both energy bars 36 are energized to expose the patterned area to light or other electromagnetic radiation to fuse build material where fusing agent has been applied, as roller carriage 28 carrying energy bars 36 is moved over work area 12. The fusing agent absorbs energy to help sinter, melt or otherwise fuse the patterned build material. Manufacturing proceeds layer by layer and slice by slice until the object is complete.

Figure 4:
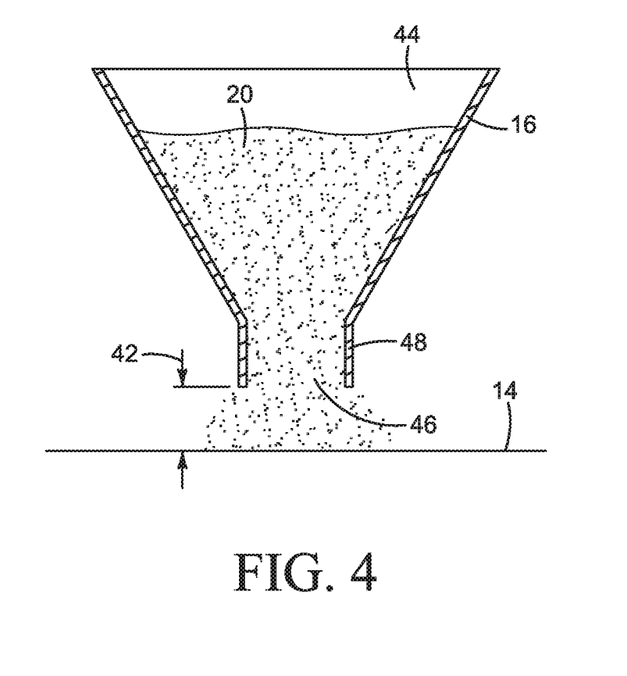
FIGS. 4 and 5 are sections illustrating the build material ribbon dispenser used in the example supply system shown in FIG. 1.
Figure 5:
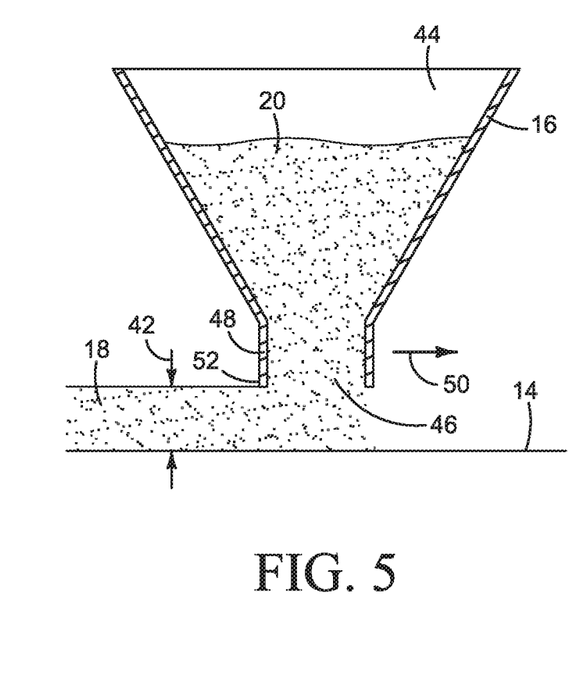

FIGS. 4 and 5 are sections illustrating one example of a dispenser 16, such as might be used in system 10 shown in FIG. 1. Referring to FIGS. 4 and 5, dispenser 16 is spaced apart from supply deck 14 across a gap 42. In this example, dispenser 14 is configured as a hopper that includes a receptacle 44 to hold build material 20 and an elongated opening 46 oriented horizontally along a bottom part 48 of receptacle 44. As shown in FIG. 5, a ribbon 18 of powdered build material 20 may be dispensed from receptacle 44 through opening 46 on to deck 14 as dispenser 16 is moved over deck 14. Opening 46 extends lengthwise in a direction perpendicular to the direction of motion of dispenser 16. The direction of motion of dispenser 16 is indicated by arrow 50 in FIG. 5.

Gap 42 is small enough to choke the flow of powder 20 from hopper 16 when hopper 16 is stationary over deck 14 and big enough to allow powder flow when hopper 16 is moving over deck 14. In FIG. 4, hopper 16 is stationary to choke (and thus block) the flow of powder 20 through opening 46 across gap 42. When hopper 16 is stationary as shown in FIG. 4, powder 20 will only flow out of opening 46 until the powder accumulating in gap 42 meets opening 46, at which point the flow is choked off. This choking condition will block the flow of powder 20 until there is relative motion between hopper 16 and deck 14. When hopper 16 is moving, as shown in FIG. 5, powder 20 is dragged from opening 46 and flows into gap 42 and on to deck 14 until hopper 16 stops. The bottom part 48 of hopper 16 acts as a metering blade 52 to layer powder 20 on to deck 14 in a ribbon 18. (One side of hopper bottom 48 will serve as the metering blade 52 depending on the direction of motion of hopper 16—the left side in FIG. 5 for motion 50 to the right.) So long as the speed of hopper 16 does not exceed the flow capacity of opening 46, the thickness of ribbon 18 will be determined by the size of gap 42. Accordingly, gap 42 can be set to the desired thickness for ribbon 18.

While a stationary supply deck 14 and a movable dispenser 16 are shown for dispensing powder ribbon 18, it may be desirable in some implementations to dispense ribbon 18 from a stationary dispenser 16 on to a movable supply deck 14, or by moving both deck 14 and dispenser 16 with respect to one another. Also, while the size of gap 42 may be varied by moving one or both of hopper 16 and supply deck 14 vertically with respect to one another, an adjustable metering blade 52 may also be used to vary the size of gap 42.

Figure 6:
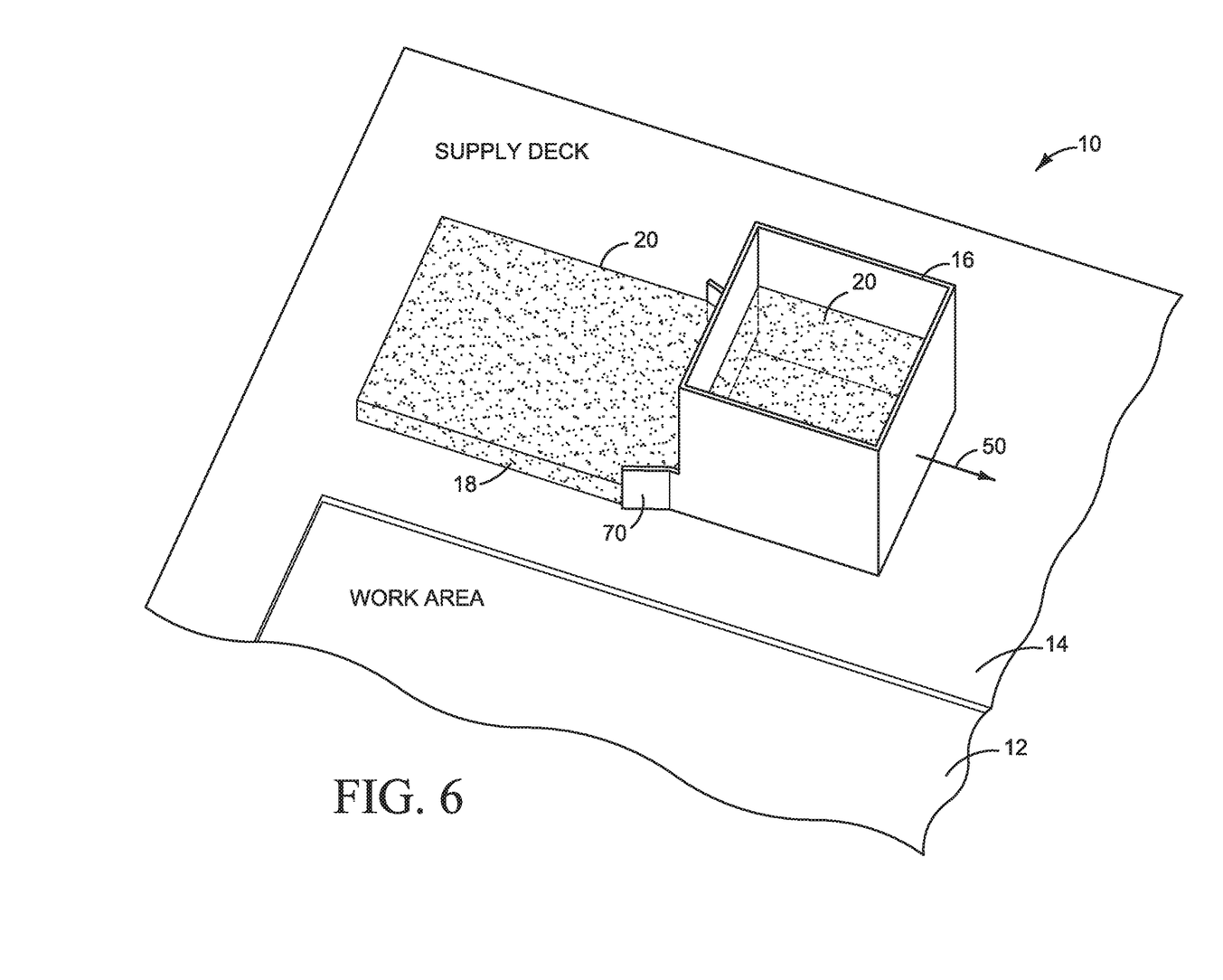
FIG. 6 is a perspective illustrating another example of a build material supply system for additive manufacturing.
Figure 7:
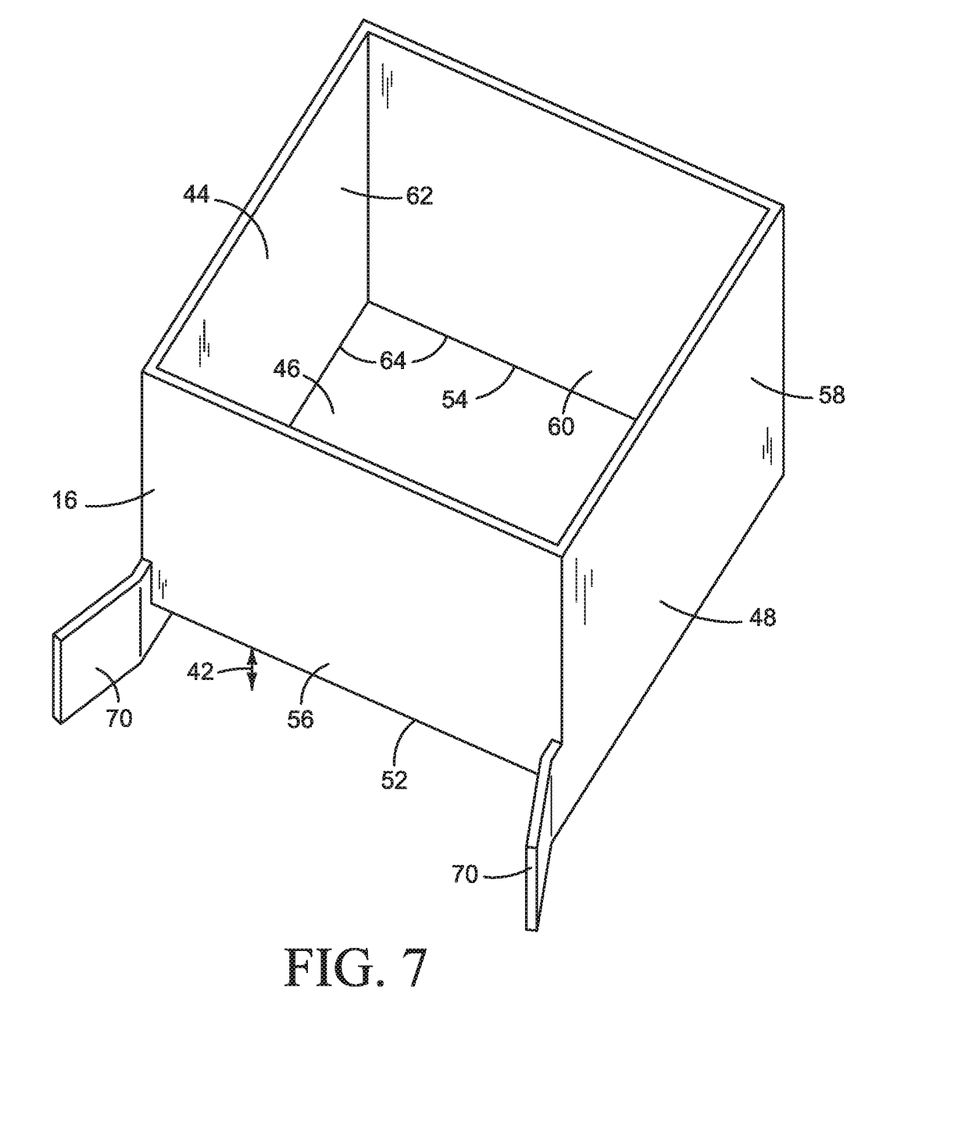
FIG. 7 is a perspective and FIGS. 8-11 are sections illustrating the build material ribbon dispenser from the example supply system shown in FIG. 6.

FIG. 6 is a perspective illustrating another example of a dispenser 16 used in a build material supply system 10. FIG. 7-11 show dispenser 16 from FIG. 6 in more detail. Referring to FIGS. 6-11, dispenser 16 includes a receptacle 44 and an opening 46 through which powder may be dispensed from receptacle 44. Opening 46 is flanked by two blades—a metering blade 52 and a wiping blade 54. In this example, a rectangular dispenser 16 includes walls 56, 58, 60, and 62 defining receptacle 44. Metering blade 52 is formed along the bottom of one wall 56 and wiping blade 54 is formed along the bottom of the opposite wall 60. Wiping blade 54 at the bottom of wall 60 and the bottom of adjoining walls 58, 60 for a base 64 that rests on supply deck 14. Wall 56 is shorter than walls 58-60 to make a gap 42 between metering blade 52 and supply deck 14.

Figures 8, 9:
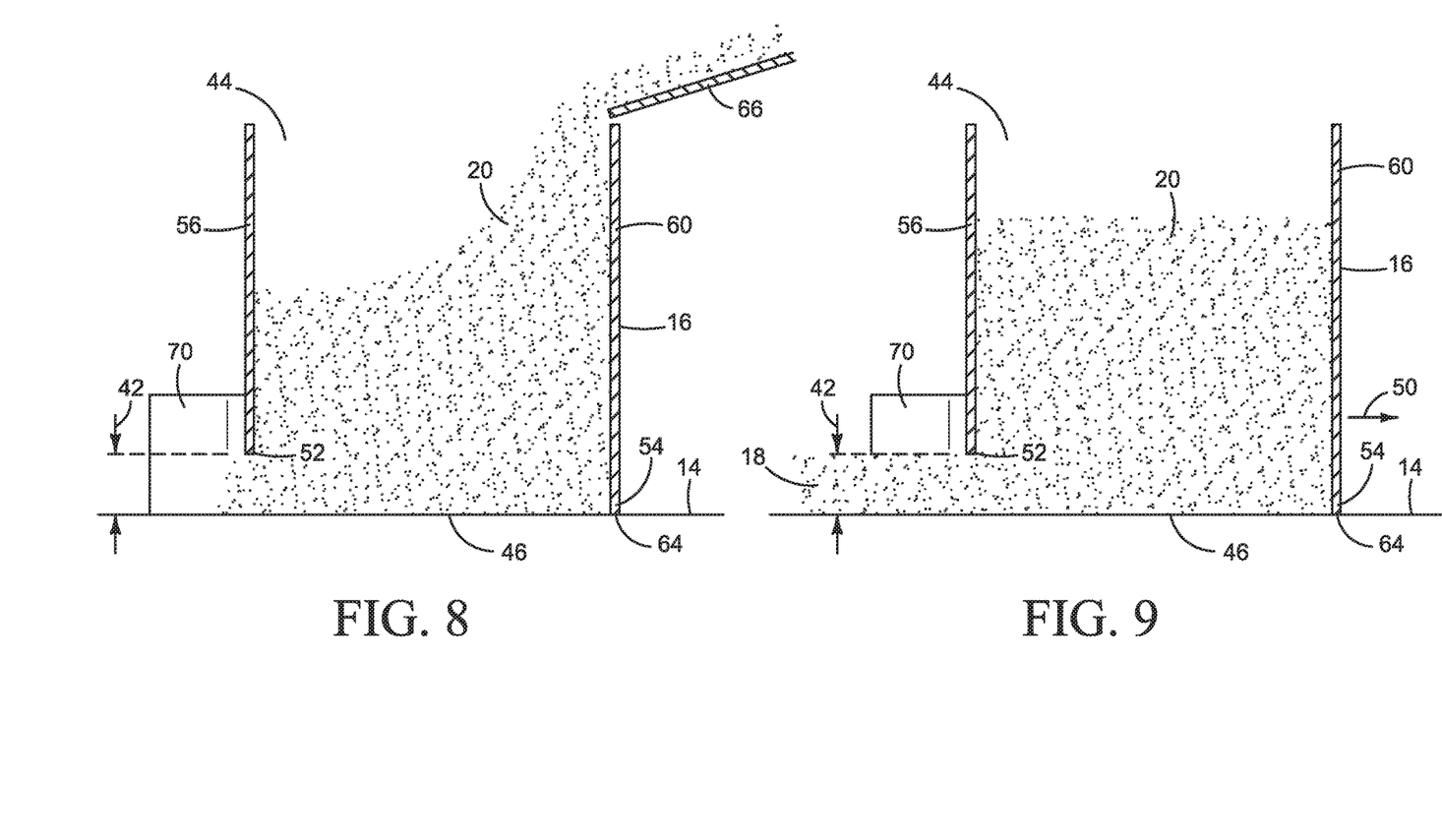
Figure 10:
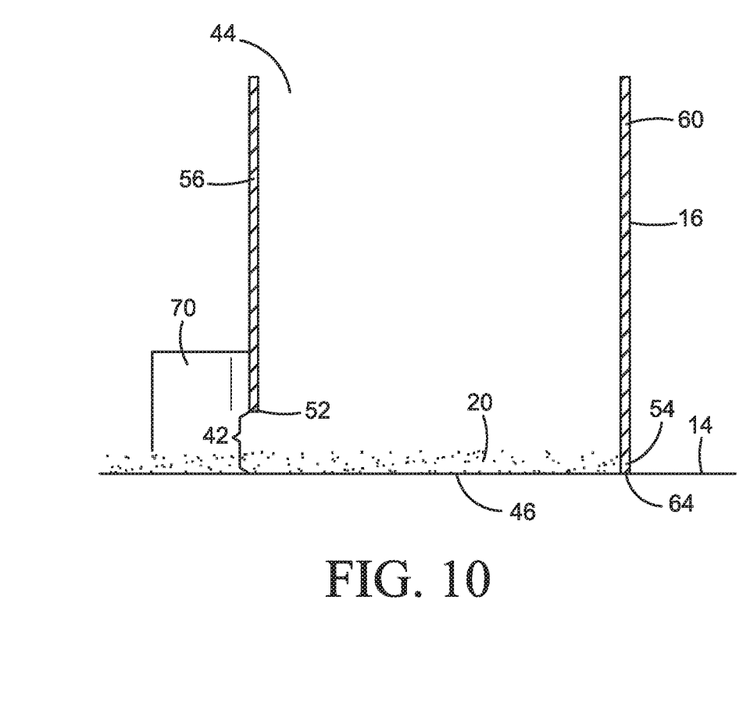
Figure 11:
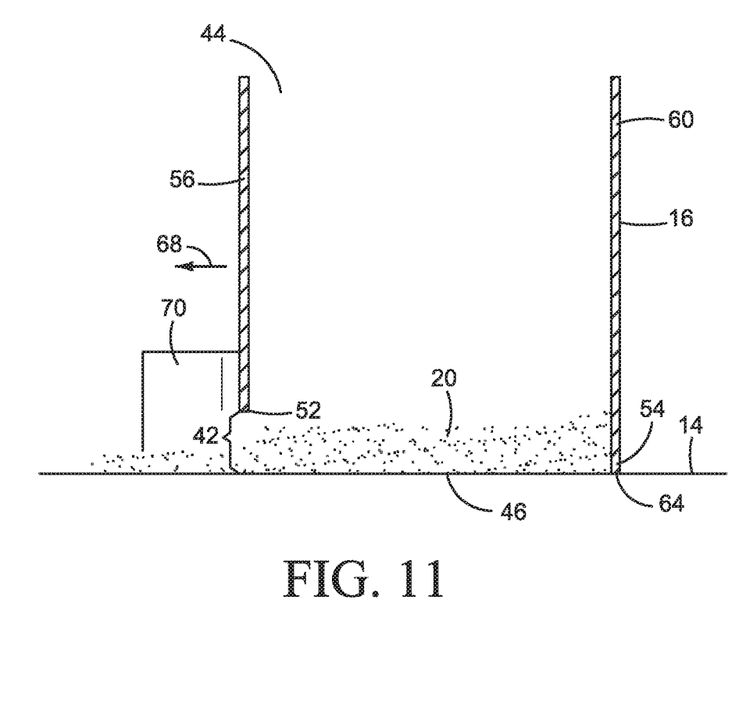

Referring now specifically to the sections shown in FIGS. 8-11, gap 42 may be set to meter ribbon 18 on to supply 14 at the desired thickness using a choked flow condition. Thus, when dispenser 16 is stationary, as shown in FIG. 8, powder 20 will only flow out through gap 42 until the powder accumulating in gap 42 meets blade 52, at which point the flow is choked off. This choking condition, which will block the flow of powder 20 until there is relative motion between dispenser 16 and deck 14, may be used to resupply receptacle 44 with build material 20 on supply deck 14. For example, dispenser 16 may be parked under a fill chute 66 (or chute 66 may be moved in to position over dispenser 16), as shown in FIG. 8, to refill receptacle 44 from a larger supply reservoir (not shown).

When dispenser 16 is moving with metering blade 52 trailing, as indicated by arrow 50 in FIG. 9, powder 20 flows through gap 42 and on to deck 14 to form ribbon 18. When dispenser 16 is moving with wiping blade 54 trailing, as indicated by arrow 68 in FIG. 11, any powder remaining on deck 14 is collected in receptacle 44. Dispenser 16 may include guides 70 to help channel powder 20 into receptacle 44 during a wiping operation and to help form the sides of ribbon 18 during a dispensing operation. Although a fixed position metering blade 52 is used in the example shown in FIGS. 6-11, a movable metering blade 52 could be used in other examples to more easily adjust the size of gap 42.

Figure 13:
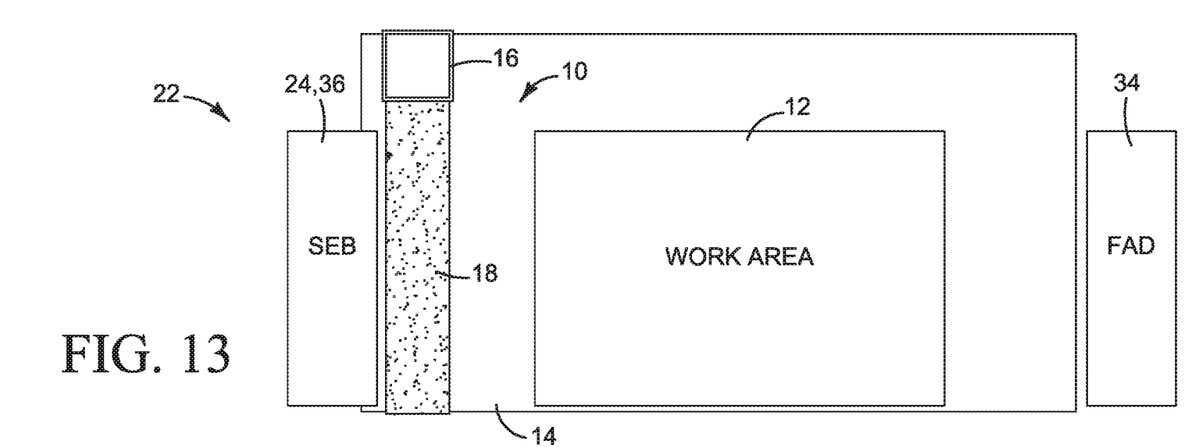

Testing shows that polyamide build material powder commonly used in additive manufacturing may be uniformly layered to a thickness of 0.8 mm-2.0 mm in a ribbon 18 that is 30 mm-80 mm wide using a choked flow dispenser, such as a dispenser 16 shown in FIGS. 1 and 6, resulting in aspect ratios in the range of 15:1 to 100:1. In some operations, it may be desirable to dispense a volume of powder to supply ribbon 18 to cover only a portion of the work area. In other operations, it may be desirable to dispense a sufficient volume of powder to supply ribbon 18 to completely cover the work area 12 to the thickness of the fusing layer. Thus, for complete coverage, where a ribbon 18 may be dispensed to any length corresponding to the length of a work area 12, as shown in FIG. 13 for example, the volume per unit length (H×W) of ribbon 18 may be at least equal to that of the work area. For example, if a build material is to be layered to a thickness of 0.1 mm across a 300 mm wide work area, then a supply ribbon 1 mm high and 30 mm wide, 0.8 mm high and 38 mm wide, or 0.6 mm high and 50 mm wide, for example, will contain a volume of powder just sufficient to cover the work area to the desired thickness. Of course, t maybe desirable to dispense a volume of powder into ribbon 18 that is more than enough to cover the work area to the desired thickness, for example to account for any variability in the density of the powder and/or irregularities in the surface of the work area. In addition to the desired volume, other factors may affect the aspect ratio of a powder supply ribbon 18 within the range noted above. For one example, the type of heating system used may limit the thickness (height) of a supply ribbon 18 that can be pre-heated effectively on a supply deck 14. For another example, the spreader roller or other layering system may limit the width of a supply ribbon that can be spread effectively over the work area. The characteristics of the powder itself may also effect the aspect ratio of the supply ribbon 18.

Figure 12:
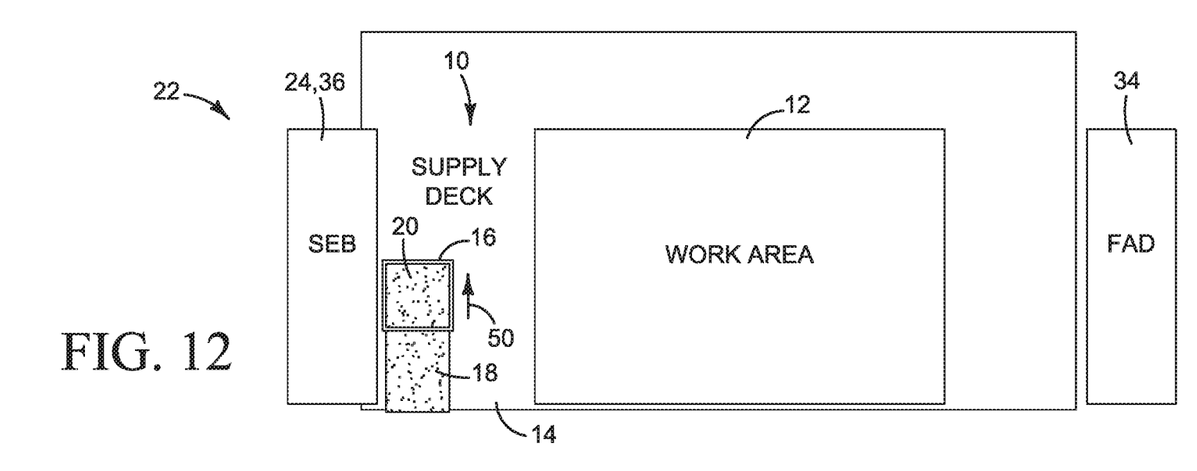
FIGS. 12-18 present a sequence of plan view diagrams illustrating one example of an additive manufacturing process using a build material supply system such as the example system shown in FIG. 6.

Referring now to the sequence of views in FIGS. 12-18, an additive manufacturing machine 22 includes supply system 10 (with work area 12, supply deck 14, and ribbon dispenser 16), a spreader 24, an energy bar 36, and a fusing agent dispenser 34. Spreader 24 and energy bar 36 are depicted by a block labeled SEB in FIGS. 12-18 and may be carried together back and forth over work area 12 on a carriage 28 shown in FIGS. 2 and 3. Fusing agent dispenser 34 is depicted by a block labeled FAD in FIGS. 12-18 and may be carried back and forth over work area 12 on a carriage 38 shown in FIGS. 2 and 3. In FIG. 12, SEB 24, 36 and FAD 34 are parked and dispenser 16 is moving over supply deck 14, as indicated by arrow 50, to dispense a ribbon 18 of build material 20. In FIG. 13, dispenser 16 has completed ribbon 18 and is parked out to the side of supply deck 14. Also, in this example, dispenser 16 is empty of build material 20 after dispensing ribbon 18.

Figure 14:
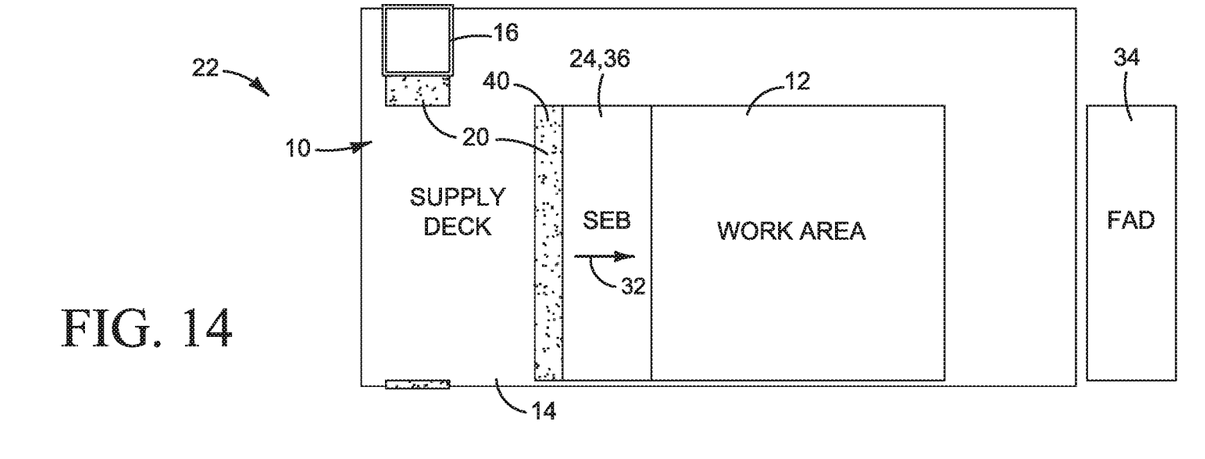
Figure 15:
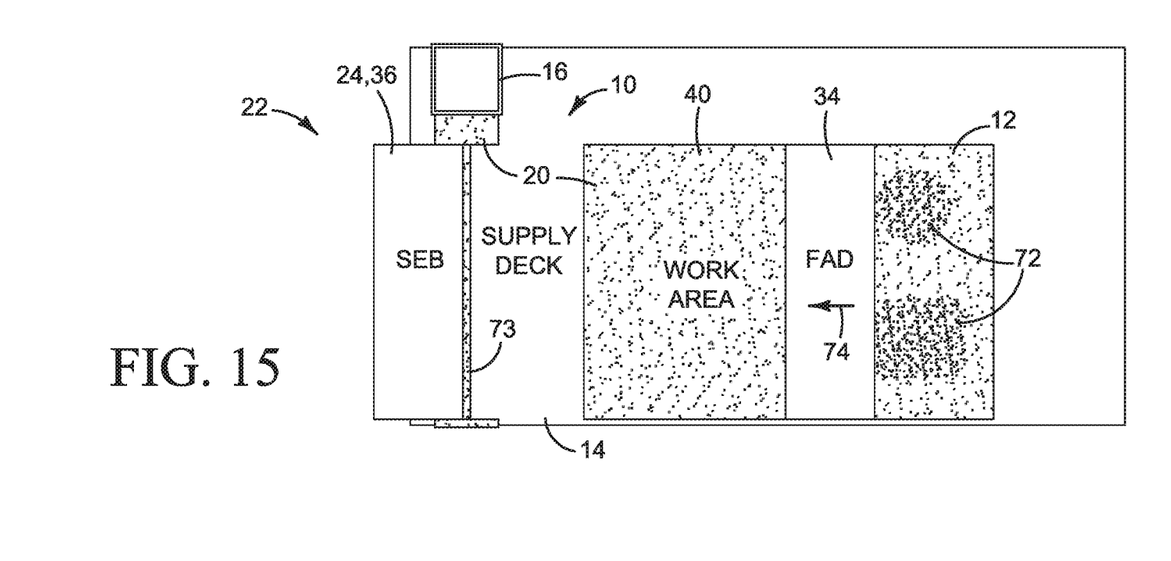
Figure 16:
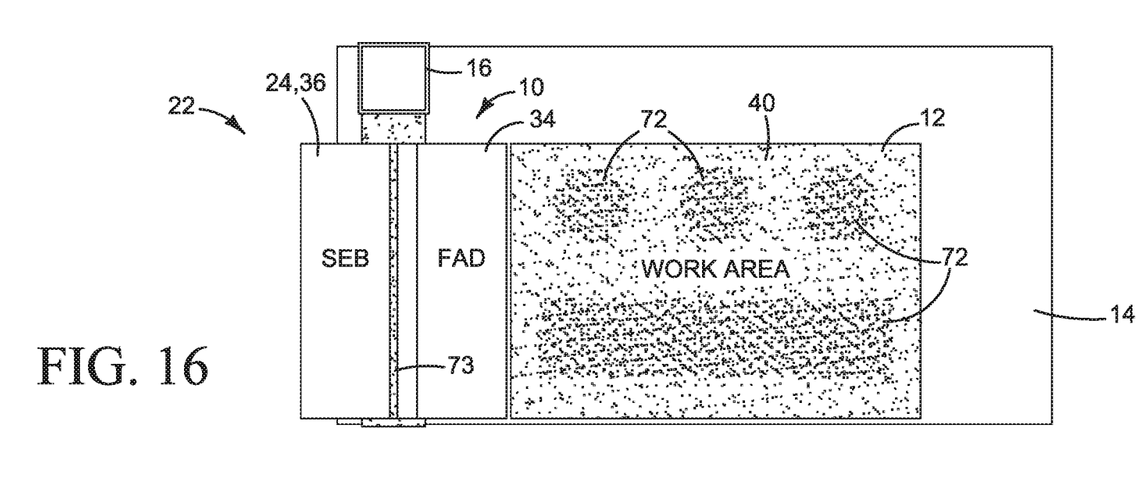

In FIG. 14, SEB 24, 36 is spreading a layer 40 of build material 20 over work area 12, as indicated by arrow 32. During this pass, SEB 24, 36 may also pre-heat build material 20 in ribbon 18 with an energy bar 36, as shown in FIG. 2, in advance of spreader 24 spreading build material 20 over work area 12. In FIGS. 15 and 16, SEB 24, 36 is parked and FAD 34 is applying fusing agent to build material 20 in layer 40 in a pattern 72 corresponding to an object slice, as FAD 34 is scanned over work area 12, as indicated by arrow 74 in FIG. 15. Also shown in FIGS. 15 and 16 is a line of powder residue 73 deposited by SEB 24, 36 after its layering pass over work area 12.

Figure 17:
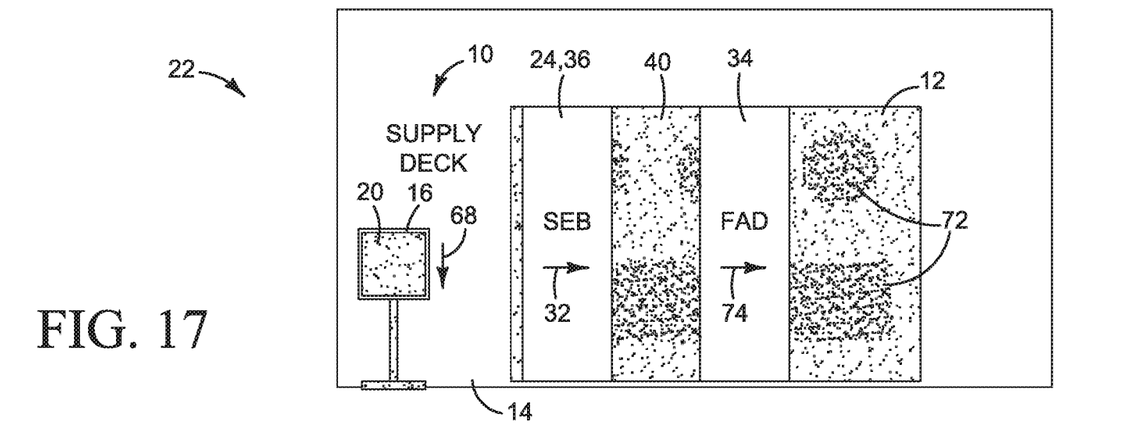
Figure 18:
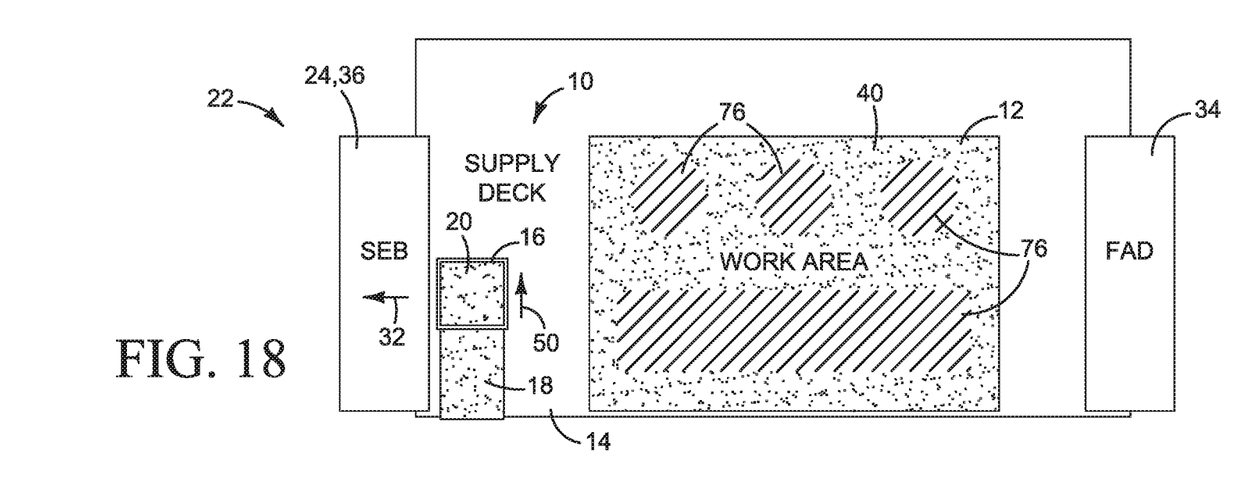

In FIG. 17, FAD 74 is scanned back over work area 12, for example to apply more fusing agent and/or to apply a detailing agent to build material 20 in layer 40, or merely to return to its parking position. Also in FIG. 17, SEB 24, 36 is being scanned over work area 12 to irradiate patterned build material with fusing energy, as indicated by arrow 32, and dispenser 16 is cleaning powder residue 73 from supply deck 14, for example with a wiping blade 54 shown in FIG. 11, as indicated by arrow 68 in FIG. 17. In FIG. 18, patterned build material has been fused to form object slice 76, SEB 24, 36 and FAD 34 are parked, and a re-supplied dispenser 16 is again moving over supply deck 14 to dispense a ribbon 18 of build material 20 in preparation for the next patterning and fusing operation, as indicated by arrow 50.

An additive manufacturing that uses a liquid fusing agent, such as a machine 22 shown in FIGS. 2-3 and FIGS. 12-18, is just one type of additive manufacturing machine that may utilize a build material supply system 10 with a powder dispenser 16. Laser sintering machines and other additive manufacturing machines and processes that use a powdered build material may also utilize examples of the new build material supply system and powder "ribbon" dispenser.

Figure 19:
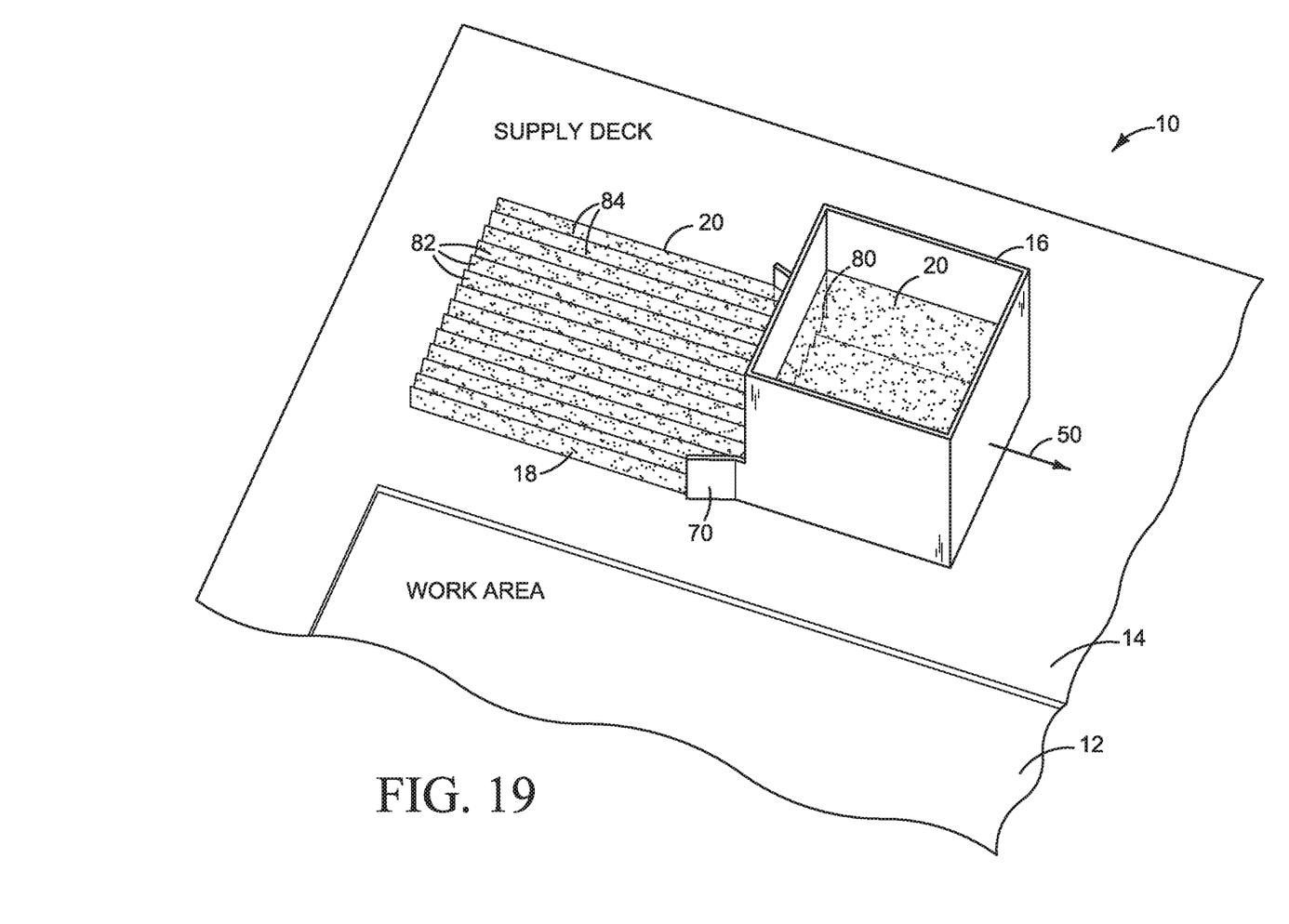
FIG. 19 is a perspective illustrating another example of a build material supply system for additive manufacturing.
Figure 20:
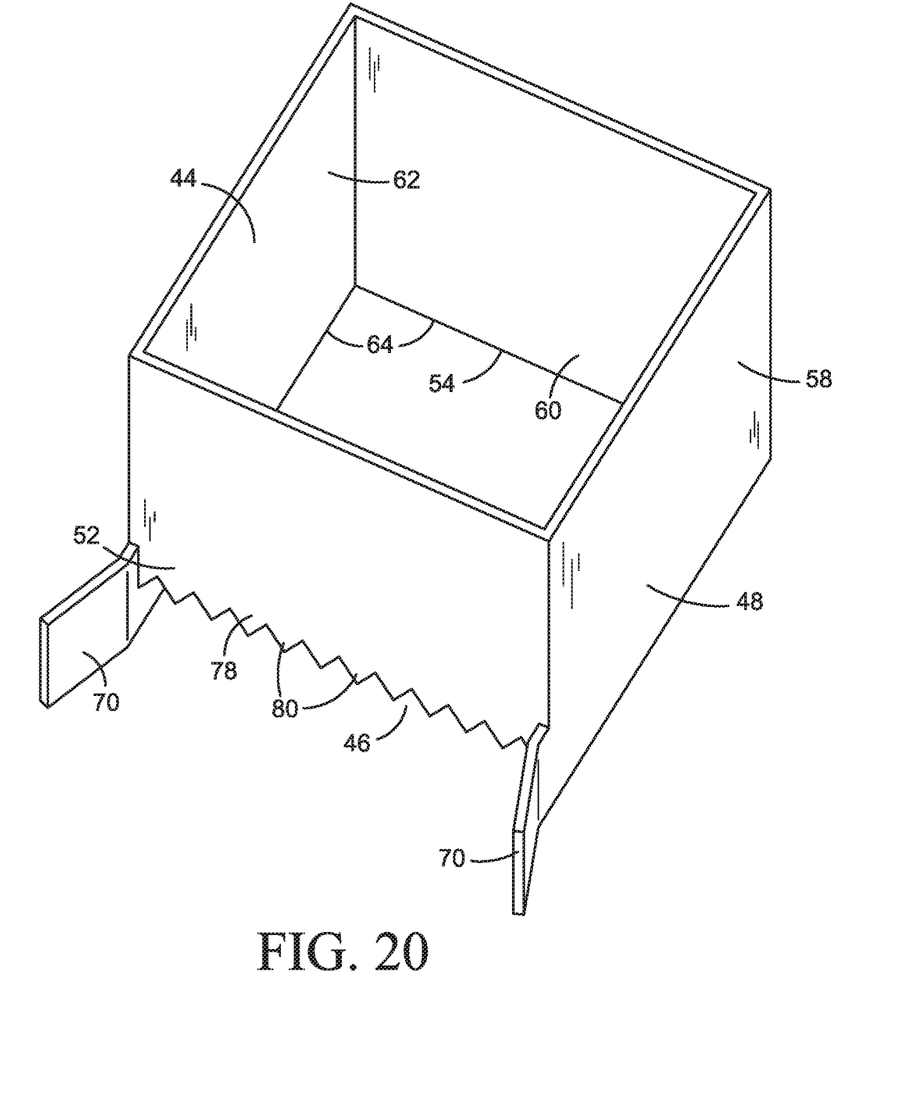
FIG. 20 is a perspective illustrating the build material ribbon dispenser from the example supply system shown in FIG. 19.

A metering blade 52 in dispenser 16 may be readily adapted to roughen the surface of powder ribbon 18 to reduce reflectance and thus increase radiative heating efficiency. FIG. 19 is a perspective illustrating another example of a dispenser 16 used in a build material supply system 10 to roughen the surface of ribbon 18. FIG. 20 is a perspective showing dispenser 16 from FIG. 19 in more detail. Referring to FIGS. 19 and 20, the edge 78 of metering blade 52 includes irregularities 80 to roughen the surface 82 of the powder ribbon 18. In the example shown, irregularities 80 are configured as teeth to make furrows 84 in ribbon surface 82. Roughening of the surface of the powder in ribbon 18 helps reduce the reflection of irradiating energy, for more effective heating.

Figure 21:
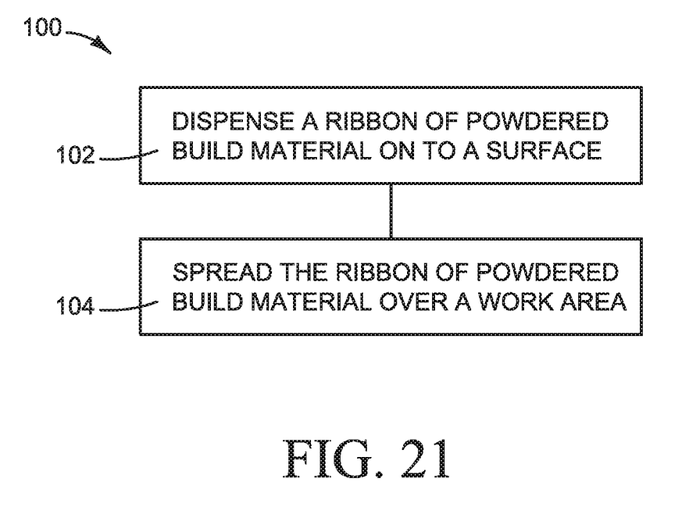
FIG. 21 is a flow diagram illustrating one example of a build material supply process for additive manufacturing.

FIG. 21 is a flow diagram illustrating a build material supply process 100 for additive manufacturing. Referring to FIG. 21, process 100 includes dispensing a ribbon of powdered build material on to a surface (block 102), for example as shown in FIG. 1, and then spreading the ribbon of powdered build material over a work area (block 104), for example as shown in FIGS. 2 and 3.

The examples shown in the figures and described above illustrate but do not limit the patent, which is defined in the following Claims.

"A", "an" and "the" used in the claims means at least one. For example, "a dispenser" means at least one dispenser and subsequent reference to "the dispenser" means the at least one dispenser.

The invention claimed is:

1. A powdered build material supply system for additive manufacturing, the system comprising:
    a supply deck adjacent to a separate work area;
    a dispenser to dispense a ribbon of powdered build material on to the supply deck adjacent to an edge of the work area;
    a spreader to spread powdered build material from the ribbon over the work area; and
    an energy bar with the spreader to heat the ribbon of powdered build material before the spreader moves the build material to the work area from the supply deck;

wherein the dispenser is movable over the supply deck, and in front of the spreader in a direction that is perpendicular to movement of the spreader across the work area.

2. The system of claim 1, wherein the spreader comprises a roller on a carriage to spread the powdered build material to the work area from the supply deck.

3. The system of claim 1, where the dispenser comprises a hopper wherein a first and second opposite sides of the hopper each function as a blade of the dispenser depending on which direction the dispenser moves.

4. The system of claim 1, where the energy bar is mounted on and moves with the spreader over the supply deck.

5. The system of claim 1, where:
the movable dispenser includes a receptacle to hold powdered build material and an opening along a bottom part of the receptacle through which powdered build material may be dispensed from the dispenser, the gap between the bottom part of the receptacle and the supply deck sized to block a flow of powdered build material on to the deck when the dispenser is stationary over the deck and to allow the flow of powdered build material on to the supply deck when the dispenser is moving over the surface.

6. The system of claim 1, further comprising a second, trailing energy bar with the spreader to heat build material in the work area after spreading.

7. An article for dispensing powdered build material for additive manufacturing, the article comprising:
a movable receptacle to hold powdered build material, the receptacle moveable over a supply deck that is adjacent to a separate work area where objects are formed from the powdered build material, the receptacle moveable over the supply deck along and outside of an edge of the work area;
an opening through which powdered build material may be dispensed from the receptacle to the supply deck in a ribbon along and outside of an edge of the work area; and
a spreader to move the powdered build material from the supply deck to the work area and spread the powdered build material in a layer over the work area; and
further comprising a wiping blade to wipe a surface of the supply deck under the receptacle when the receptacle is moving over the surface.

8. The article of claim 7, further comprising a metering blade along the opening to layer powdered build material dispensed from the receptacle onto a surface of the supply deck when the receptacle is moving over the surface.

9. The article of claim 7, further comprising an energy bar with the spreader to heat the ribbon of powdered build material before the spreader moves the build material to the work area from the supply deck.

10. The article of claim 9, further comprising a second, trailing energy bar with the spreader to heat build material in the work area after spreading.

11. The article of claim 7, further comprising:
a metering blade along the opening to layer powdered build material dispensed from the receptacle onto a surface of the supply deck when the receptacle is moving over the surface;
wherein:
the wiping blade forms one side of the receptacle defining an exposed planar edge to contact the surface of the supply deck under the receptacle; and
the metering blade forms another side of the receptacle with an exposed edge offset from the planar edge formed by the wiping blade to form a gap between the edge of the metering blade and a surface under the receptacle.

12. The article of claim 11, where the gap is small enough to choke the flow of powdered build material through the opening on to the surface under the receptacle when the receptacle is stationary over the surface.

13. The article of claim 11, where the metering blade and the wiping blade are oriented parallel to one another.

14. The article of claim 11, where:
the metering blade forms a trailing edge when the receptacle is moving in a first direction;
the wiping blade forms a leading edge when the receptacle is moving in the first direction;
the wiping blade forms a trailing edge when the receptacle is moving in a second direction opposite the first direction; and
the metering blade forms a leading edge when the receptacle is moving in the second direction.

15. The article of claim 11, where the metering blade includes an irregular edge to roughen a surface of the ribbon.

16. The article of claim 15, where the irregular edge to roughen a surface of the ribbon includes teeth to furrow the surface of the ribbon.

17. A process for additive manufacturing, comprising:
dispensing a ribbon of powdered build material on to a surface;
after dispensing the ribbon of powdered build material, operating a carriage comprising an energy bar for heating the ribbon of build material and a spreader, the energy bar preceding the spreader on the carriage when moving in a direction over the surface toward a work area; and
with the spreader on the carriage, spreading the ribbon of powdered build material, that has been heated by the preceding energy bar, from the surface and over the work area.

18. The process of claim 17, wherein dispensing the ribbon of powdered build material comprises moving a dispenser over the surface while releasing powdered build material adjacent to the work area to form the ribbon of powdered build material.

19. The process of claim 17, further comprising flattening an upper surface of the ribbon of powdered build material when dispensing the ribbon of powdered build material.

\* \* \* \* \*